(12) United States Patent (10) Patent No.: US 12,669,919 B2
Sato et al. (45) Date of Patent: Jun. 30, 2026

(54) INFORMATION PROCESSING DEVICE

(71) Applicant: Preferred Networks, Inc., Tokyo (JP)

(72) Inventors: Takuya Sato, Tokyo (JP); Keisuke Mochida, Tokyo (JP); Takanori Uzuka, Tokyo (JP)

(73) Assignee: Preferred Networks, Inc., Tokyo (JP)

( * ) Notice: Subject to any disclaimer, the term of this patent is extended or adjusted under 35 U.S.C. 154(b) by 270 days.

(21) Appl. No.: 18/663,669

(22) Filed: May 14, 2024

(65) Prior Publication Data

US 2024/0385735 A1 Nov. 21, 2024

(30) Foreign Application Priority Data

May 17, 2023 (JP) ................................. 2023-081771

(51) Int. Cl.
*G06F 3/0484* (2022.01)
*A63F 13/56* (2014.01)
*G06F 8/34* (2018.01)
*A63F 13/63* (2014.01)

(52) U.S. Cl.
CPC ............ *G06F 3/0484* (2013.01); *A63F 13/56* (2014.09); *G06F 8/34* (2013.01); *A63F 13/63* (2014.09)

(58) Field of Classification Search
CPC .................................................... G06F 3/0484
USPC .......................................................... 715/710
See application file for complete search history.

(56) References Cited

U.S. PATENT DOCUMENTS

| | | | | |
|---|---|---|---|---|
| 8,291,408 | B1 * | 10/2012 | Czymontek | ............... G06F 8/34 |
| | | | | 717/113 |
| 11,763,078 | B2 * | 9/2023 | Wilson-Thomas | ... G06F 40/274 |
| | | | | 715/816 |
| 12,011,836 | B2 * | 6/2024 | Kang | ..................... B25J 9/1666 |
| 2014/0047413 | A1 * | 2/2014 | Sheive | ...................... G06F 8/33 |
| | | | | 717/110 |

(Continued)

FOREIGN PATENT DOCUMENTS

| | | |
|---|---|---|
| JP | 2017-219718 | 12/2017 |
| JP | 2017219718 A | * 12/2017 |

OTHER PUBLICATIONS

Tadatoshi Hirono, "Lesson 15 How to make an agent place a torch," "Lesson 20 How to place a torch on a wall," "Lesson 45 How to replace coordinates with variables," and "Lesson 49 How to change participant's equipment," Introduction to Minecraft Programming that can be enjoyed on a personal computer, 1st edition, Impress Corporation, 2018, pp. 52-53, 70-75, 156-159, 168-171, ISBN 978-4-295-00351-9, With English concise explanation.

(Continued)

*Primary Examiner* — Reza Nabi
(74) *Attorney, Agent, or Firm* — IPUSA, PLLC

(57) ABSTRACT

An information processing device includes at least one memory; and at least one processor. The at least one processor is configured to display a screen for creating a program that causes a character to perform a series of actions by visual programming, a plurality of program components being arranged on the screen, and the plurality of program components indicating a plurality of actions included in the series of actions; and perform, based on a detection of a failure of an action performed by the character, a notification related to a program component indicating the action that the character fails to perform.

17 Claims, 12 Drawing Sheets

(56)         References Cited

U.S. PATENT DOCUMENTS

| 2020/0110792 | A1 * | 4/2020 | Tsabba | G06F 3/167 |
| 2020/0110796 | A1 * | 4/2020 | Tsabba | G06F 8/38 |
| 2022/0055216 | A1 * | 2/2022 | Kang | B25J 9/1661 |
| 2023/0214310 | A1 * | 7/2023 | Evain | G06F 11/3688 |
| | | | | 717/125 |
| 2023/0325216 | A1 * | 10/2023 | Aebi | G06F 3/04842 |
| | | | | 715/733 |
| 2024/0202245 | A1 * | 6/2024 | Mahadevan | G06F 16/90328 |
| 2024/0382852 | A1 * | 11/2024 | Sato | A63F 13/63 |
| 2024/0385735 | A1 * | 11/2024 | Sato | G06F 3/0484 |

OTHER PUBLICATIONS

[Minecraft Programming] How to make an agent place a torch, Introduction to Minecraft Programming, Dekiru Net, Tadatoshi Hirono, Aug. 26, 2019, <URL: https://dekiru.net/article/18574/>, Retrieved on Mar. 12, 2024.

[Minecraft programming] How to place a torch on a wall, Introduction to Minecraft Programming, Dekiru Net, Tadatoshi Hirono, Sep. 2, 2019, <URL: https://dekiru.net/article/18579/>, Retrieved on Mar. 12, 2024.

[Minecraft Programming] How to replace coordinates with variables, Introduction to Minecraft Programming, Dekiru Net, Tadatoshi Hirono, Oct. 9, 2019, <URL: https://dekiru.net/article/18604/>, Retrieved on Mar. 12, 2024.

[Minecraft Programming] How to change participant's equipment, Introduction to Minecraft Programming, Dekiru Net, Tadatoshi Hirono, Oct. 16, 2019, <URL: https://dekiru.net/article/18608/>, Retrieved on Mar. 12, 2024.

* cited by examiner

INFORMATION PROCESSING DEVICE — 100

OPERATION RECEIVING UNIT — 101

PROGRAMMING UNIT — 103

ERROR DETECTING UNIT — 104

SCREEN DISPLAY UNIT — 102

ERROR NOTIFYING UNIT — 105

MESSAGE STORAGE UNIT — 106

ACTION CONTROL UNIT — 108

CODE CONVERTING UNIT — 107

FIG.8

| NUMBER | ERROR MESSAGE | DESCRIPTION |
|---|---|---|
| 1-1 | OBJECT BEING SEARCHED IS NOT FOUND. | DISPLAYED WHEN OBJECT DESIGNATED BY PLAYER ON PROGRAM IS NOT PRESENT IN ACTION RANGE. |
| 1-2 | OBJECT TO WHICH CHARACTER TURNS IS NOT FOUND. | DISPLAYED WHEN PROGRAMMING TARGET CHARACTER CANNOT TURN IN ITS DIRECTION BECAUSE OBJECT DESIGNATED BY PLAYER ON PROGRAM IS NOT PRESENT IN ACTION RANGE. |
| 1-3 | OBJECT THAT CAN BE PICKED UP IS NOT FOUND. | DISPLAYED WHEN OBJECT DESIGNATED BY PLAYER ON PROGRAM CANNOT BE PICKED UP BECAUSE OBJECT IS NOT PRESENT IN ACTION RANGE. |
| 1-4 | SELECTED BUILDING IS NOT FOUND. | DISPLAYED WHEN BUILDING DESIGNATED BY PLAYER ON PROGRAM IS NOT PRESENT IN ACTION RANGE. |
| 1-5 | NO PLANTABLE FIELD IS FOUND. | DISPLAYED WHEN FIELD DESIGNATED BY PLAYER ON PROGRAM IS NOT PRESENT IN ACTION RANGE. |
| 1-6 | NO HARVESTABLE FIELD IS FOUND. | DISPLAYED WHEN OBJECT THAT CHARACTER CAN HARVEST IS NOT PRESENT IN FIELD DESIGNATED BY PLAYER ON PROGRAM. |
| 1-7 | NO CUTTABLE TREE IS FOUND. | DISPLAYED WHEN CUTTABLE TREE IS NOT PRESENT AROUND WHEN PLAYER INSTRUCTS OPERATION TO CUT TREE ON PROGRAM. |
| 1-8 | THERE IS NO CRAFT EQUIPMENT IN FRONT OF CHARACTER. | DISPLAYED WHEN EQUIPMENT FOR PROCESSING MATERIAL DESIGNATED BY PLAYER ON PROGRAM IS NOT PRESENT. |
| 1-9 | THERE IS NO DESIGNATED MINE. | DISPLAYED WHEN MINE OBJECT DESIGNATED BY PLAYER ON PROGRAM IS NOT PRESENT. |

FIG.9

| NUMBER | ERROR MESSAGE | DESCRIPTION |
|---|---|---|
| 2-1 | NO ORE IS FOUND. | DISPLAYED WHEN ORE DESIGNATED BY PLAYER ON PROGRAM IS NOT PRESENT IN ACTION RANGE. |
| 2-2 | CANNOT HAVE ANY MORE. | DISPLAYED WHEN OPERATION TO HAVE NEW OBJECT IS INSTRUCTED WHEN PROGRAMMING TARGET CHARACTER HAS A MAXIMUM NUMBER OF OBJECTS. |
| 2-3 | OBJECT BEING SEARCHED HAS DISAPPEARED. | DISPLAYED WHEN OBJECT DESIGNATED BY PLAYER ON PROGRAM HAS DISAPPEARED. |
| 2-4 | OBJECT TO WHICH CHARACTER TURNS HAS DISAPPEARED. | DISPLAYED WHEN PROGRAMMING TARGET CHARACTER CANNOT TURN IN ITS DIRECTION BECAUSE OBJECT DESIGNATED BY PLAYER ON PROGRAM HAS DISAPPEARED. |
| 2-5 | ITEM TO BE PICKED UP HAS DISAPPEARED. | DISPLAYED WHEN ITEM DESIGNATED BY PLAYER ON PROGRAM HAS DISAPPEARED. |
| 2-6 | ROUTE SEARCH FAILURE. | DISPLAYED WHEN MOVABLE ROUTE IS NOT FOUND (WHEN ROUTE IS BLOCKED BY OBSTACLE OR THE LIKE) WHEN PLAYER INSTRUCTS OPERATION TO MOVE TO PLACE DESIGNATED BY PLAYER ON PROGRAM. |
| 2-7 | DESTINATION IS TOO FAR. | DISPLAYED WHEN PLACE DESIGNATED BY PLAYER ON PROGRAM IS FARTHER BY FIXED DISTANCE OR GREATER. |
| 2-8 | NO ITEM IS IN POSSESSION. | DISPLAYED WHEN NO ITEM IS IN POSSESSION WHEN PLAYER TRIES TO OPERATE POSSESSED ITEM ON PROGRAM. |
| 2-9 | NO SEEDS ARE IN POSSESSION. | DISPLAYED WHEN NO SEEDS ARE IN POSSESSION WHEN PLAYER INSTRUCTS OPERATION TO PLANT SEEDS ON PROGRAM. |

FIG.10

| NUMBER | ERROR MESSAGE | DESCRIPTION |
|---|---|---|
| 3-1 | ITEM CANNOT BE USED. | DISPLAYED WHEN ITEM CANNOT BE USED WHEN PLAYER TRIES ITEM TO BE USED ON PROGRAM. |
| 3-2 | ITEM IS NOT PUT. | DISPLAYED WHEN ITEM IS NOT PUT IN DESIGNATED CHEST WHEN PLAYER INSTRUCTS OPERATION TO PICK UP ITEM FROM CHEST ON PROGRAM. |
| 3-3 | ITEM CANNOT BE ACCOMMODATED. | DISPLAYED WHEN DESIGNATED CHEST IS NOT IN STATE IN WHICH ITEM CAN BE ACCOMMODATED (WHEN THE MAXIMUM NUMBER OF ITEMS ARE ACCOMMODATED AND THE LIKE) WHEN PLAYER INSTRUCTS OPERATION TO ACCOMMODATE ITEM IN CHEST ON PROGRAM. |
| 3-4 | THERE IS NO CREATED ITEM. | DISPLAYED WHEN ITEM IS NOT PUT IN DESIGNATED WORKBENCH WHEN PLAYER INSTRUCTS OPERATION TO TAKE ITEM FROM WORKBENCH ON PROGRAM. |
| 3-5 | CRAFT CANNOT BE DONE. | DISPLAYED WHEN THERE IS NOT SUFFICIENT MATERIAL ON DESIGNATED WORKBENCH WHEN PLAYER INSTRUCTS OPERATION TO CREATE ITEM BY PROGRAM. |

INFORMATION PROCESSING DEVICE

CROSS-REFERENCE TO RELATED APPLICATIONS

This patent application is based on and claims priority to Japanese Patent Application No. 2023-081771 filed on May 17, 2023, the entire contents of which are incorporated herein by reference.

TECHNICAL FIELD

The present disclosure relates to an information processing device.

BACKGROUND

A programming learning device that supports learning of programming is used. Some programming learning devices are for visual programming of creating a program by combining program components in a block form or the like.

RELATED ART DOCUMENT

Patent Document

[Patent Document 1] Japanese Laid-open Patent Application Publication No. 2017-219718

SUMMARY

According to one aspect of the present disclosure, an information processing device includes at least one memory; and at least one processor. The at least one processor is configured to display a screen for creating a program that causes a character to perform a series of actions by visual programming, a plurality of program components being arranged on the screen, and the plurality of program components indicating a plurality of actions included in the series of actions; and perform, based on a detection of a failure of an action performed by the character, a notification related to a program component indicating the action that the character fails to perform.

BRIEF DESCRIPTION OF THE DRAWINGS

FIG. 8 is a diagram illustrating examples of an error message;

FIG. 9 is a diagram illustrating examples of the error message;

FIG. 10 is a diagram illustrating examples of the error message;

DETAILED DESCRIPTION OF EMBODIMENTS

Figure 1:
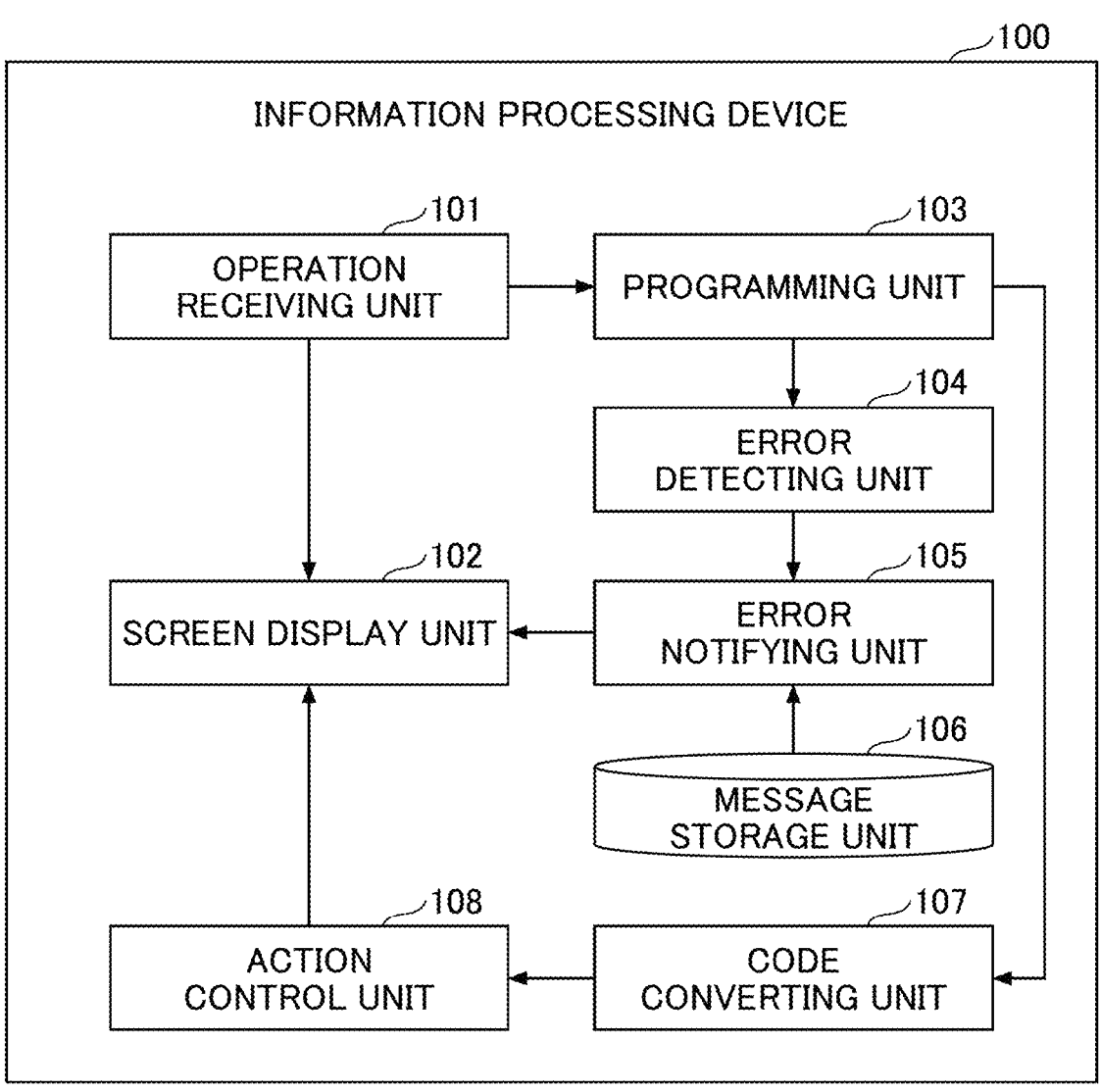
FIG. 1 is a block diagram illustrating an example of a functional configuration of an information processing device.

In the following, embodiments of the present disclosure will be described with reference to the accompanying drawings. In the present specification and drawings, components having substantially the same functional configuration are denoted by the same reference numerals, and duplicated description thereof will be omitted.

[Outline of Information Processing Device]

One embodiment of the present disclosure is an information processing device configured to execute a game program for providing a computer game. The computer game in the present embodiment is what is called an open world type computer game in which a character, which is an avatar of a player, is caused to perform various actions in a virtual space, which is the game world. The game world is not limited to the open world type. Additionally, the virtual space is not limited to a three-dimensional space, and may be a two-dimensional space. The computer game in the present embodiment has a function of creating a program for controlling an action of another character existing in the virtual space.

Hereinafter, a character operated by the player is also referred to as an "operated character". Additionally, a character that can be controlled by a program is also referred to as a "controlled character". The operated character and the controlled character exist in the virtual space, which is the game world.

In the computer game according to the present embodiment, an operation of causing the operated character to action is performed on a field screen on which the game world is rendered. The field screen is, for example, a screen on which the virtual space is displayed in the three dimensions. On the field screen, the operated character acts in the virtual space in response to the operation of the player. Examples of the operation that can be performed by the operated character include walking, running, jumping, attacking an enemy character, defending against an attack by an enemy character, acquiring an item, and working with a held item.

In the computer game of the present embodiment, the player can create a program for controlling the action of the controlled character. For example, the player can control the action of the controlled character in order to achieve an objective set in the virtual space. The objective to be achieved may be set by the player himself/herself or may be set by the game program in accordance with a progress of the computer game. The objective to be achieved may be, for example, constructing a building, harvesting a crop, manufacturing an item such as equipment, defeating an enemy character, and the like. The objective to be achieved is not limited to these, and any objective that can be realized in the virtual space may be set.

The controlled character is a non-player character (NPC) that is not operated by the player. The controlled character acts autonomously in the virtual space until the player creates a program.

The player selects a controlled character to be programmed on the field screen, and creates a program for causing the controlled character to perform a series of actions. The controlled character being a programming target performs the series of actions in the virtual space according to the program created by the player. The player may create a program for causing multiple controlled characters to perform respective different actions, and cause the multiple controlled characters to perform the actions in parallel. This program may be a program created separately for each controlled character, or may be a common program created for multiple controlled characters.

The program is created using a programming screen that allows visual programming. On the programming screen, one program is created by arranging program components having predetermined functions and connecting the program components. The program components include a component having a function of instructing the controlled character to perform an action, and a component having a function related to execution control such as a conditional branch or repetition.

The programming screen in the present embodiment has a function of notifying an error that occurs in the program. Hereinafter, this notification is referred to as an "error notification". The error that occurs in the program includes, for example, a failure in the action instructed to the character.

The error notification includes a first error notification for highlighting a program component in which an error occurs and a second error notification for displaying a reason why the error occurs. In the present embodiment, when a program component in which an error occurs is detected from a program created by the player, the first error notification is performed first. Next, when the player performs an operation on the program component highlighted by the first error notification, the second error notification is performed. Therefore, it can be said that the program component in which the error occurs is also highlighted by the second error notification. However, the procedure for notifying the error is not limited to the above, and for example, the first error notification and the second error notification may be performed at the same time. Additionally, only one of the first error notification or the second error notification may be performed.

Here, the highlighting is to display the program component in which the error occurs in a mode in which the player can distinguish the program component from a program component in which no error occurs. That is, as described later, the concept of the highlighting may include a mode of displaying an error icon or an error message on the program component in which the error occurs, a mode of displaying the program component in which the error occurs by blinking, a mode of changing a character color, a background color, a font, or a size of the program component in which the error occurs from that of a program component in which no error occurs, and a mode of darkly or brightly displaying the program component in which the error occurs with lower or higher luminance than that of the display when no error occurs.

[Functional Configuration of Information Processing Device]

A functional configuration of the information processing device according to the embodiment of the present disclosure will be described with reference to FIG. 1. FIG. 1 is a block diagram illustrating an example of the functional configuration of the information processing device according to the present embodiment.

As illustrated in FIG. 1, an information processing device 100 according to the present embodiment includes an operation receiving unit 101, a screen display unit 102, a programming unit 103, an error detecting unit 104, an error notifying unit 105, a message storage unit 106, a code converting unit 107, and an action control unit 108. The information processing device 100 functions as the operation receiving unit 101, the screen display unit 102, the programming unit 103, the error detecting unit 104, the error notifying unit 105, the message storage unit 106, the code converting unit 107, and the action control unit 108 by executing a game program installed in advance.

The information processing device 100 is an information processing device such as a personal computer, a tablet computer, or a smartphone operated by the player of the computer game. The information processing device 100 may be a game console, a portable game console, or a non-portable game console. The information processing device 100 may include a display device configured to display a screen for the player to perform operations on the computer game. The display device may be a display or the like connected to the information processing device 100 via a wired or wireless interface.

The operation receiving unit 101 receives an operation by the player. The operation by the player is performed on a screen displayed on the display device by the computer game. The operation by the player differs depending on the type of screen on which the operation is performed. The operation receiving unit 101 performs control to execute another processing unit according to the content of the received operation.

The screen display unit 102 displays a screen on the display device according to the control of another processing unit. Additionally, the screen display unit 102 changes the contents of the screen displayed on the display device according to the control of another processing unit.

The programming unit 103 creates a program for controlling the action of the controlled character in accordance with the operation of the player on the programming screen. In the present embodiment, the program created by the programming unit 103 may be a visual program in which program components in a block form are arranged. The programming unit 103 creates the program by arranging the program components in the block form and connecting the program components in accordance with the operation of the player.

The error detecting unit 104 detects a program component in which an error occurs from the program created by the programming unit 103. The error is a failure of the action of the controlled character in the virtual space (the game world). That is, the program component in which the error occurs is synonymous with a program component indicating the action that the controlled character is instructed to perform but fails to perform, and the program component in which no error occurs is synonymous with and a program component indicating the action that the controlled character is instructed to perform and does not fail to perform. Specifically, the error detecting unit 104 detects an action that the controlled character fails in the virtual space, and detects a program component that instructs the action.

Even if the controlled character fails to perform the action instructed by the program component in the virtual space, the action instructed by the next program component may be performed according to the execution order of the program. That is, the error detecting unit 104 detects an action that does not cause the program itself to fail (does not stop the execution of the program) even when the controlled character fails to perform the action, but cannot achieve at least a part of the content of the action of the controlled character instructed by the program when the controlled character fails to perform the action in the virtual space, and the error detecting unit 104 detects a program component instructing the action.

If a first action instructed by a first program component fails, a second action dependent on a result of the first action may also fail. In this case, the error detecting unit 104 may detect the first action and the second action that fail, and detect not only the first program component that instructs the first action but also the second program component that instructs the second action.

It is determined whether the controlled character fails to perform the action instructed by the program component, according to a state (or a condition) of the virtual space related to the action at the time of the execution of the program component. The error detecting unit 104 identifies the content of the action instructed by the program component, determines whether the content of the action is to be achieved (has been achieved) in the state based on the content of the action and the state of the virtual space related to the action, detects an action determined not to be achieved (not to have been achieved) as a failed action, and detects the program component instructing the action.

When a parameter of the program component is not correctly set, the error detecting unit 104 determines that an error occurs in the program component, for example. Additionally, when the action instructed to the controlled character by the program component fails, the error detecting unit 104 determines that the error occurs in the program component, for example.

The error detecting unit 104 may detect the error when the player instructs the start of the program. The error detecting unit 104 may sequentially detect errors that have occurred in the program components during the execution of the program. The error detecting unit 104 may detect the error when the program component is arranged by the player. The timing of detecting the error is not limited to these, and the error detecting unit 104 can detect the error at any timing. The error detecting unit 104 may detect the error that will occur in the program (the action indicated by the program component) when a program is executed, before the program (the action indicated by the program component) is executed, or may detect the error that has actually occurred as a result of executing the program (the action indicated by the program component).

The error notifying unit 105 notifies the player of the error detected by the error detecting unit 104. The error notifying unit 105 controls the screen display unit 102 to perform an error notification on the programming screen (trigger an error notification to be displayed on the programming screen).

The error notifying unit 105 performs a first error notification that highlights each program component detected by the error detecting unit 104 on the programming screen. When the player performs a predetermined operation on the highlighted program component, the error notifying unit 105 performs a second error notification that displays, on the programming screen, an error message (an example of a text) corresponding to the error that occurs in the program component on which the predetermined operation is performed.

In the first error notification, for example, a mark indicating that the error occurs may be displayed near each program component in which the error is detected. The mark indicating that the error occurs may be, for example, an error icon. It is only necessary to display the error icon in a form that allows the player to recognize that the error occurs. The error icon may be an icon including an exclamation mark.

The error icon may have any shape, such as a circle, a rectangle, a triangle, or a balloon, for example. The error icon may be drawn in a color that is easily distinguishable from the colors that may be used in the programming screen.

In the first error notification, for example, a display mode of the program component in which the error is detected may be changed. The change in the display mode includes, for example, a change in a character color, a change in a background color, a change in a font, a change in a size, and the like. The change in the display mode may be a dynamic change. The dynamic change in the display mode may be, for example, the program component blinking periodically for a predetermined time length, the program component getting bigger and smaller repeatedly, or the like.

In the second error notification, an error message explaining the reason why the error occurs in the operated program component may be displayed. The operation on the program component may be an operation on the program component itself or an operation on the error icon displayed in the first error notification.

The operation on the program component may be, for example, an operation of clicking or tapping the program component or the error icon, a mouse-based hover operation over the program component or the error icon, or the like.

When the error occurs in the program component that instructs the controlled character to perform the action, the error message may include a word related to the action. In other words, when the program component indicating the action that the controlled character is instructed to perform but fails to perform is detected, an error message explaining why the controlled character fails to perform the action according to the context of the instructed action may be displayed.

The message storage unit 106 stores, in advance, the error message to be displayed when the error notifying unit 105 performs the second error notification. The error message may be stored in the message storage unit 106 in association with identification information for identifying a type of the error detected by the error detecting unit 104. As an example of a method of associating the type of error with the error message, the type of error and the error message may be stored as one set; information used to acquire, from one of the pieces of information, another piece of information, may be stored; or identification information of one information and another information may be stored as one set.

The code converting unit 107 generates a code that can be executed by the computer game based on the program created by the programming unit 103. The code created by the code converting unit 107 may be described in a language in which instructions can be interpreted by the game program.

The action control unit 108 controls the action of the controlled character in the virtual space according to the code created by the code converting unit 107. The action control unit 108 controls the screen display unit 102 to display a state in which the controlled character acts on the field screen.

[User Interface of Information Processing Device]

A user interface of the information processing device according to the embodiment of the present disclosure will be described with reference to FIG. 2 to FIG. 10. The user interface can be implemented as, for example, a screen displayed on the display device by the game program installed in the information processing device 100.

<Field Screen>

Figure 2:
FIG. 2 is a diagram illustrating an example of a field screen.

The field screen in the present embodiment will be described with reference to FIG. 2. FIG. 2 is a diagram illustrating an example of the field screen.

As illustrated in FIG. 2, the virtual space is drawn on an entire field screen 200 in the three dimensions. An operated character 201, which is the avatar of the player, is displayed near the center of the field screen 200. The virtual space drawn on the field screen 200 is a range around the operated character 201.

A controlled character 202 being present around the operated character 201 is displayed on the field screen 200. Multiple controlled characters 202 may be displayed on the field screen 200. In FIG. 2, only the controlled character 202 that is close to the operated character 201 is denoted by a reference numeral.

The controlled character 202 may be also present in a range that is not displayed on the field screen 200. When the field of view of the field screen 200 is changed in accordance with the operation of the player, the controlled character 202 being present in the new field of view is displayed on the field screen 200.

A chest 203 in which various items can be accommodated and a workbench 204 on which work can be performed using the items are displayed on the field screen 200 illustrated in FIG. 2.

When the operated character 201 and the controlled character 202 approach within a predetermined range from the chest 203, they can open the door of the chest 203 and take out the item stored in the chest 203. Additionally, when the operated character 201 and the controlled character 202 approach the workbench 204 with an item being held, they can place the item on the workbench. Furthermore, when the item is placed on the workbench 204, the operated character 201 and the controlled character 202 can perform work using the item. The work that can be performed on the workbench 204 depends on a type of the workbench 204, and examples include work of manufacturing a new item by combining multiple items.

When the player performs an operation to select the controlled character 202 on the field screen 200, the programming screen is activated. The programming screen is activated in a state in which a program for causing the selected controlled character 202 to perform the action can be created.

<Programming Screen>

Figure 3:
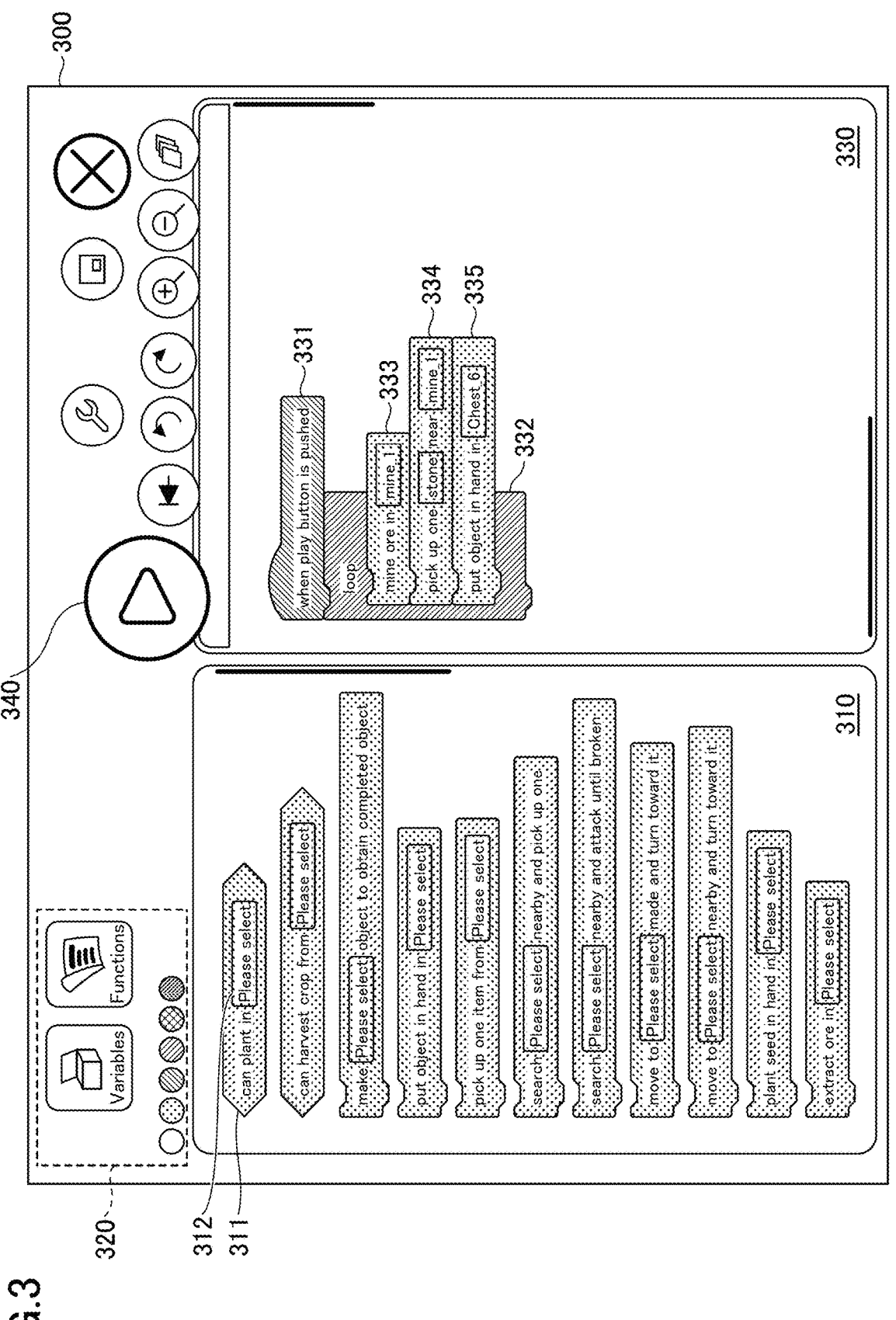
FIG. 3 is a diagram for explaining an example of a successful action.

The programming screen in the present embodiment will be described with reference to FIG. 3. FIG. 3 is a diagram illustrating an example of the programming screen.

As illustrated in FIG. 3, a programming screen 300 includes a selection area 310, a switch button 320, an arrangement area 330, and a play button 340.

A list of program components 311 that can be used in the program is displayed in the selection area 310. The switch button 320 is a button for switching the program component displayed in the selection area 310.

The program component that instructs the action may be able to set an object as the objective of the action. The program component in which the object can be set may include an input field for setting the object. In the example illustrated in FIG. 3, the program component 311 displayed in the selection area 310 includes an input field 312 in which the object can be set. In the input field 312, a text indicating that the setting of the object is necessary (for example, "Please select" or the like) may be displayed.

The player creates a program by selecting a desired program component in the selection area 310 and arranging the program component in the arrangement area 330. The operation of arranging the program component is, for example, an operation of dragging and dropping the program component from the selection area 310 into the arrangement area 330.

The player creates one program by connecting the program components in the arrangement area 330. In the present embodiment, functions indicated by the program components are performed in the order from the top to the bottom of the arrangement area 330. In the arrangement area 330, when the program component is arranged, control may be performed so that a program component automatically connected to a program component in the vicinity.

In the arrangement area 330, the order of the program components may be changed by the operation of the player. For example, the player may change the order of the program components by selecting a desired program component in the arrangement area 330 and dragging the program component upward or downward.

The play button 340 is a button for starting execution of the created program. When the player presses the play button 340, first, a program component in which an error occurs is detected from the program created in the arrangement area 330. If the program component in which the error occurs is detected, the execution of the program is interrupted, and the error is notified to the player. If no program component in which an error occurs is detected, the controlled character sequentially performs the instructed actions in accordance with the arrangement of the program components in the arrangement area 330.

In FIG. 3, as an example of the program, one program in which five program components 331 to 335 are connected is illustrated. The program component 331 is a program component indicating a condition that triggers the program. The program component 332 is a program component indicating repeat control. The program components 333 to 335 are program components instructing the controlled character to perform actions.

The program illustrated in FIG. 3 is a program for causing the controlled character to perform the following actions.

(1) When the play button is pressed, the program is started (the program component 331).

(2) Mine the ore of "mine_1" (the program component 333).

(3) Pick up one stone near "mine_1" (the program component 334).

(4) Put the object in hand in "Chest_6" (the program component 335).

(5) The actions (2) to (4) are repeatedly performed (the program component 332).

<<Error Notification>>

The error notification in the present embodiment will be described with reference to FIG. 4 to FIG. 10.

The action instructed to the controlled character may succeed or fail depending on the state of the virtual space. Here, the case of the success and the case of the failure will be described by using an action of picking up an item accommodated in the chest and placing the item on the workbench as an example.

Figure 4:
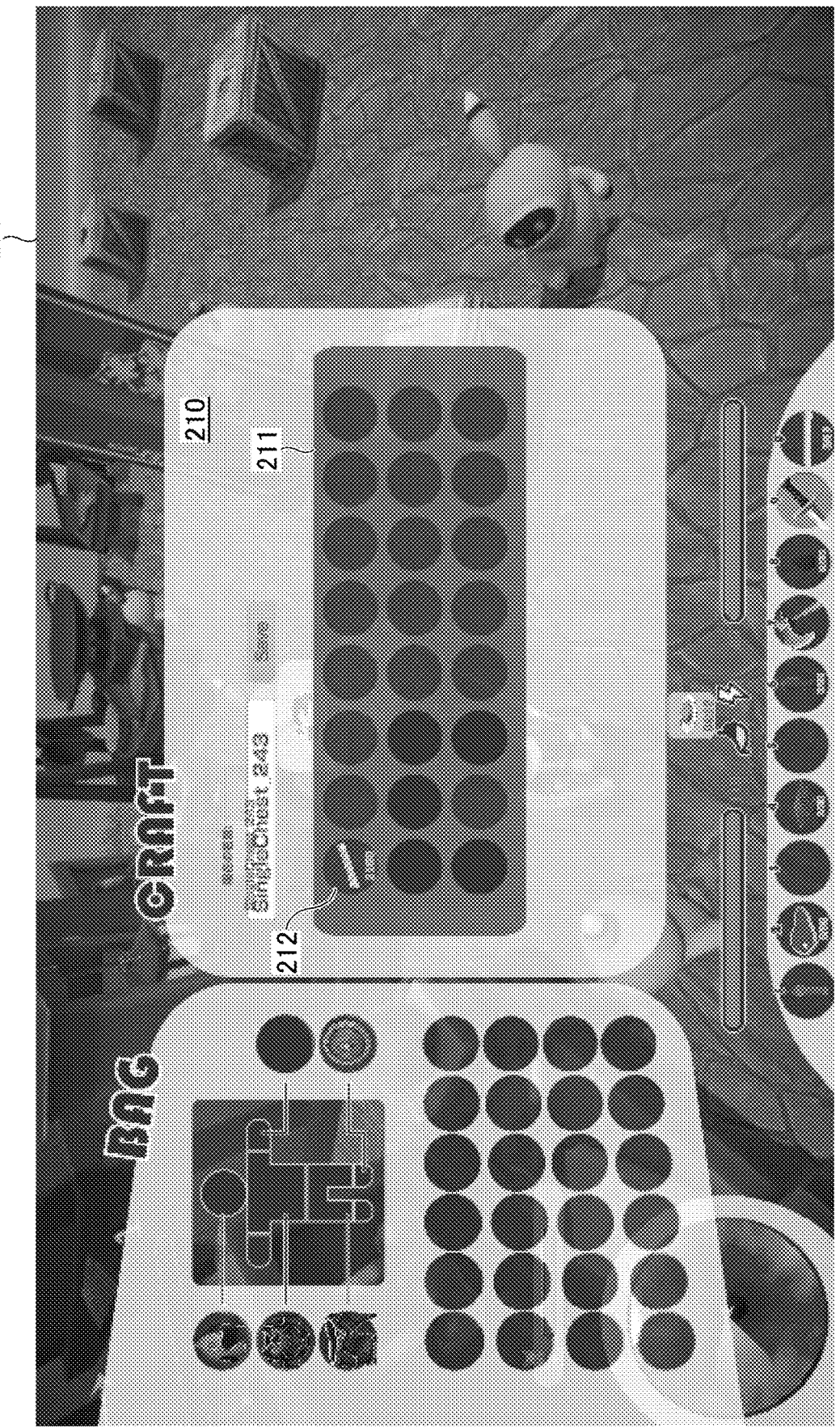
FIG. 4 is a diagram for explaining an example of a failed action.

FIG. 4 is a diagram illustrating an example of a successful action. FIG. 4 illustrates an example of the field screen 200 when the item accommodated in the chest 203 illustrated in FIG. 2 is displayed. As illustrated in FIG. 4, a list 211 of items accommodated in the chest 203 is displayed on the field screen 200.

The example illustrated in FIG. 4 illustrates that one item 212 is accommodated in the chest 203. In this case, because the controlled character 202 can pick up the item 212 from the chest 203, the action of picking up the item from the chest 203 succeeds.

Figure 5:
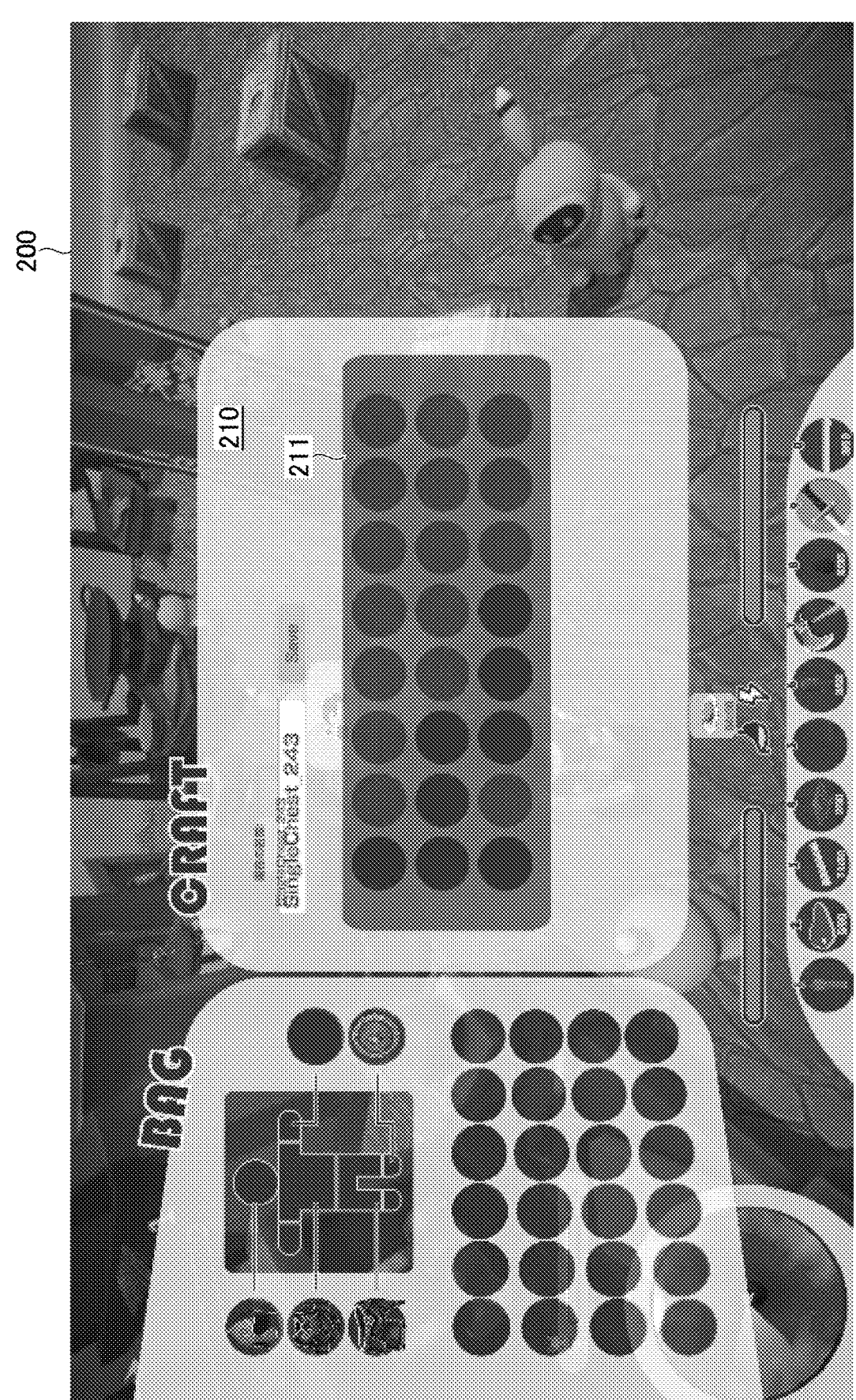
FIG. 5 is a diagram illustrating an example of a programming screen.

FIG. 5 is a diagram illustrating an example of a failed action. The example illustrated in FIG. 5 illustrates that no item is stored in the chest 203. In this case, because an item that the controlled character 202 can pick up is not accommodated in the chest 203, the action of picking up an item from the chest 203 fails.

When the action instructed to the controlled character 202 fails, the programming screen 300 in the present embodiment performs the error notification that notifies the player of the program component indicating the action that the character fails to perform. The error notification in the present embodiment includes the first error notification that highlights the program component in which the error occurs and the second error notification that displays the reason why the error occurs.

Figure 6:
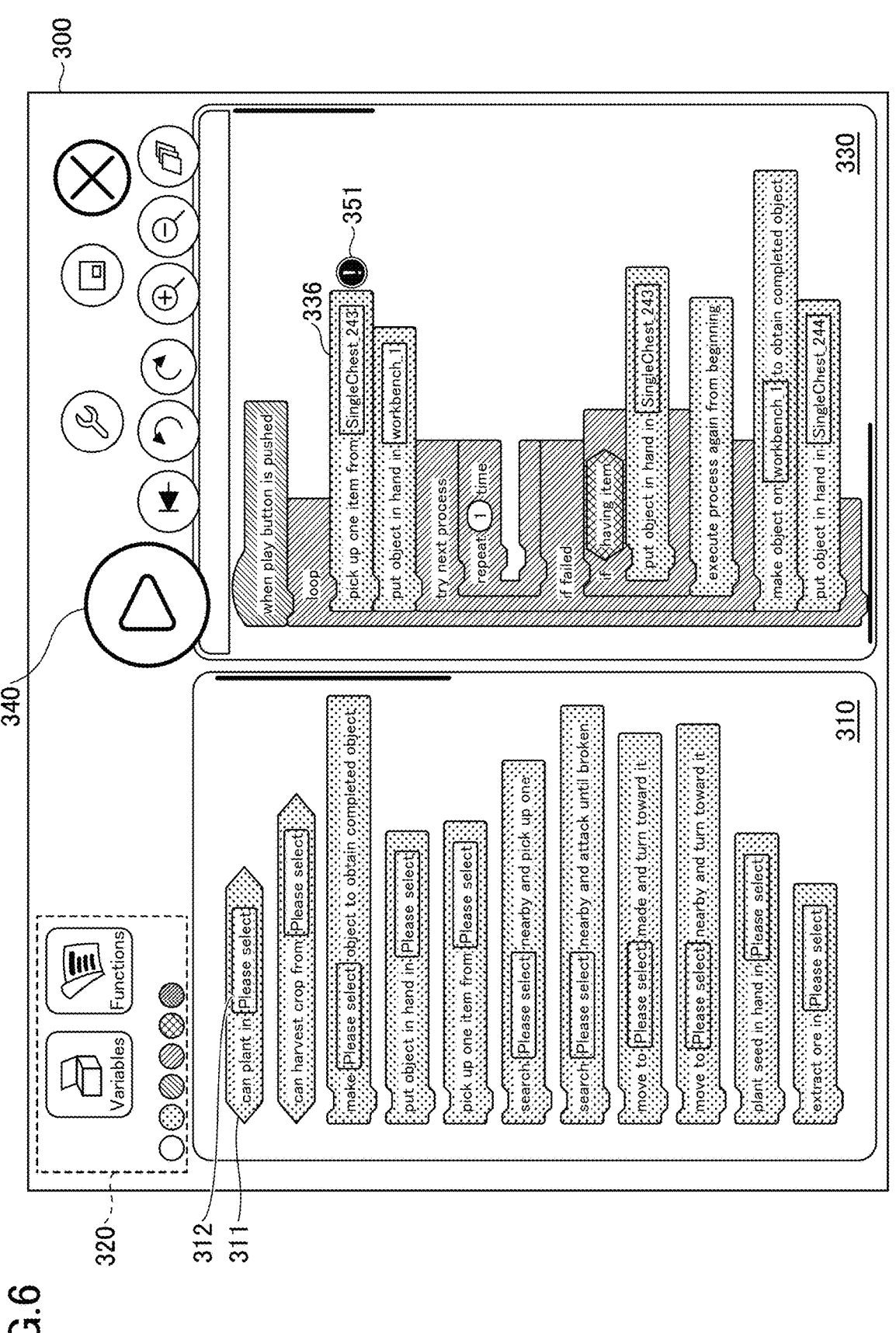
FIG. 6 is a diagram illustrating an example of a first error notification.

FIG. 6 is a diagram illustrating an example of the first error notification. As illustrated in FIG. 6, in the first error notification, the program component 336 in which the error occurs is highlighted. In the example illustrated in FIG. 6, the first error notification is performed by displaying an error icon 351 near the program component 336 in which the error occurs.

Here, in the program components subsequent to the program component in which the error occurs, if there is another program component in which an error occurs (for example, in FIG. 6, if the action of "pick up one item from SingleChest_243" fails and the action of "put object in hand in workbench_1" also fails because the controlled character has no item), the first error notification may be performed for the other program component. If no error occurs in the program component subsequent to the program component in which the error occurs (for example, in FIG. 6, if the controlled character has an item, the action of "pick up one item from SingleChest_243" fails, but the action of "put object in hand in workbench_1" succeeds because the controlled character already has an item), the first error notification need not be performed for the subsequent program components.

The player can recognize that the error occurs in the program component 336 at which the error icon 351 is displayed. The player can review the created program and, if the player understands the reason for the error, the player can correct the program in the arrangement area 330.

When a predetermined operation is performed on the program component 336 in which the error occurs, the second error notification is performed. In the present embodiment, the second error notification is performed when the player clicks on the error icon 351 displayed near the program component 336.

Figure 7:
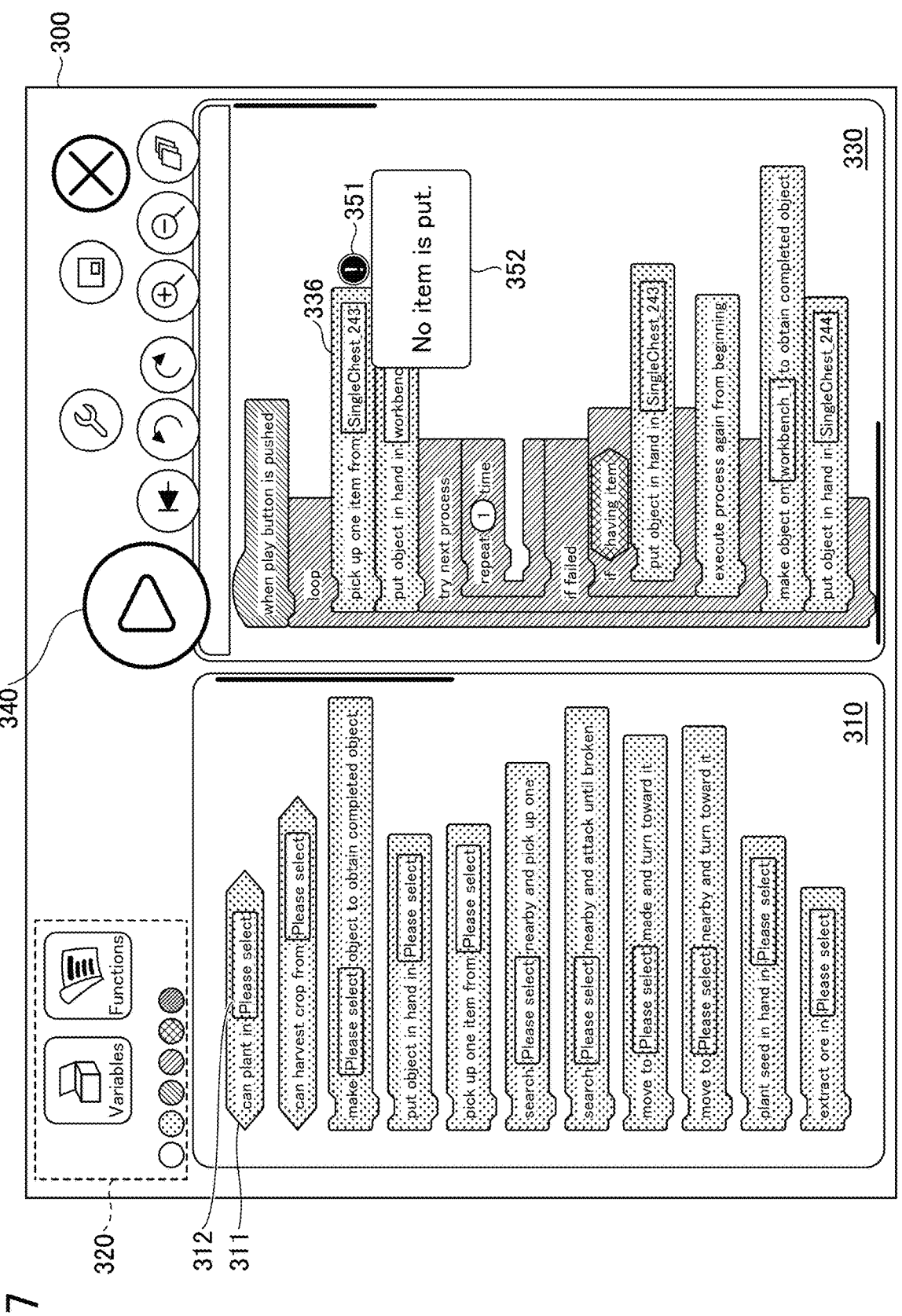
FIG. 7 is a diagram illustrating an example of a second error notification.

FIG. 7 is a diagram illustrating an example of the second error notification. As illustrated in FIG. 7, the second error notification displays the reason why the error occurs. In the example illustrated in FIG. 7, the second error notification is performed by displaying an error message 352 near the program component 336 in which the error occurs.

The player can understand the reason why the error occurs in the program component 336 by referring to the error message 352. The player can review the created program and correct the program in the arrangement area 330.

The content of the error message may explain the reason for the failure according to the context of the instructed action. The content of the error message 352 illustrated in FIG. 7 explains that no item is put as the reason why the action indicated by the program component 336 instructing the controlled character to "pick up one item from SingleChest_243" fails. As the reason why the action of picking up an item from a chest fails, if it is indicated that no item is put in the target chest, the player can easily understand that another chest containing an item needs to be selected again as the target.

In FIG. 6 and FIG. 7, as an example of the error, the case where the action of picking up an item from a chest in which no item is put is instructed has been illustrated, but the state and the reason for the occurrence of the error are not limited thereto. Various states and reasons for the occurrence of the error are conceivable in accordance with the action that can be performed by the operated character in the virtual space.

FIG. 8 to FIG. 10 are diagrams illustrating examples of the error message. The error messages illustrated in FIG. 8 to FIG. 10 are the examples of the error message stored in advance in the message storage unit 106.

FIG. 8 to FIG. 10 illustrate combinations of the error messages that can be displayed and reasons for displaying the error messages in the computer game according to the present embodiment. For example, FIG. 8 illustrates that the error message (1-1): "object being searched is not found" is displayed for the program component instructing the action of searching for a specific object when the object is not present in a range in which the controlled character can act.

As can be seen from the error messages illustrated in FIG. 8 to FIG. 10, the reason for the failure of the program component instructing the action includes not satisfying the condition for completing the action. For example, in order to complete the action of picking up an item from a chest, one or more items are required to be put in the chest. Additionally, for example, in order to complete the action of searching for a specific object, the object is required to be present in the action range.

[Processing Procedure of Information Processing Method]

Figure 11:
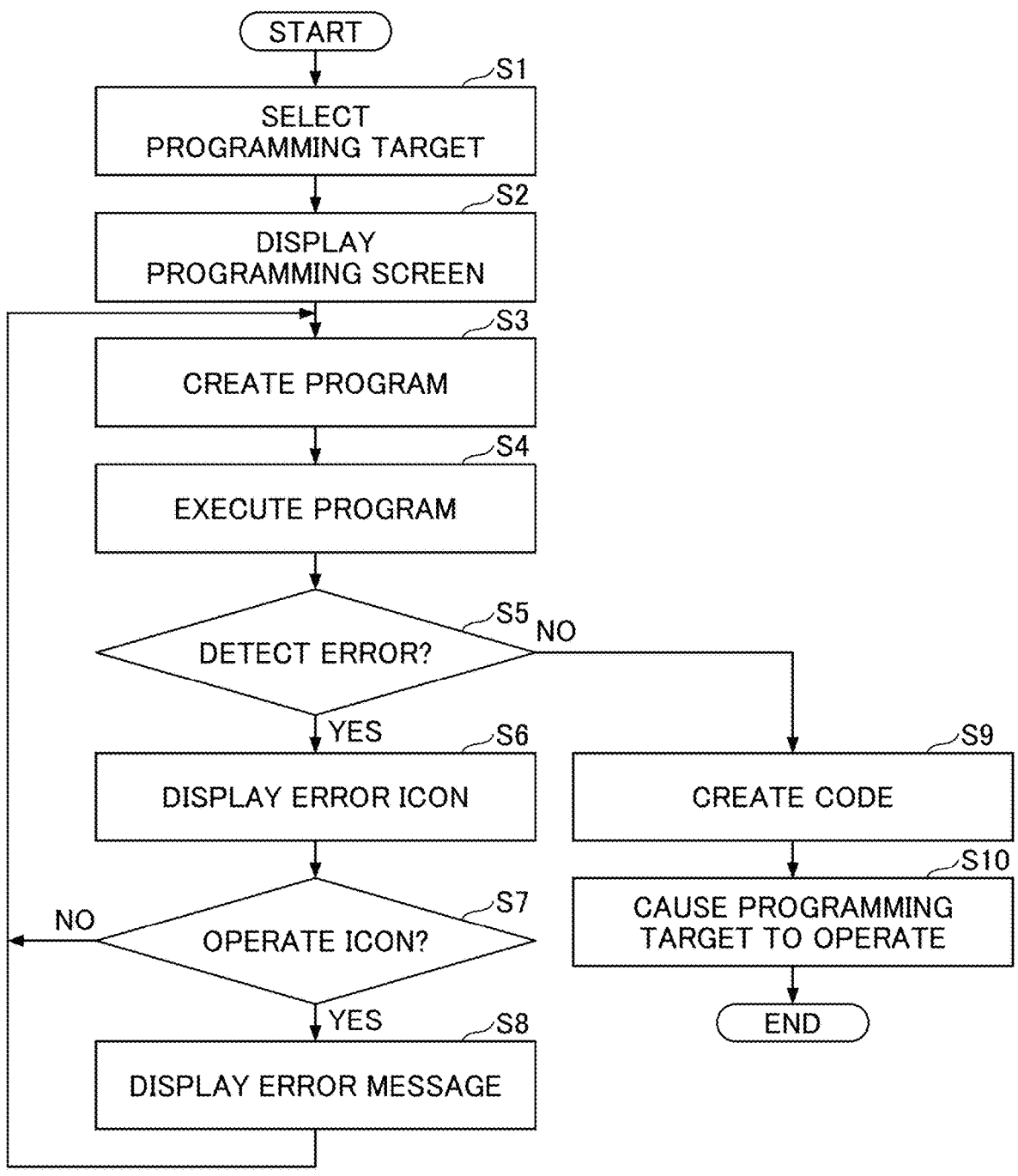
FIG. 11 is a flowchart illustrating an example of a processing procedure of an information processing method.

A processing procedure of an information processing method performed by the information processing device 100 according to the embodiment of the present disclosure will be described with reference to FIG. 11. FIG. 11 is a flowchart illustrating an example of the processing procedure of the information processing method.

In step S1, the operation receiving unit 101 selects the controlled character to be programmed (the programming target) in accordance with the operation by the player. The operation of selecting the program target is performed on the field screen 200. The operation receiving unit 101 sends information indicating the selected programming target to the screen display unit 102.

In step S2, the screen display unit 102 receives the information indicating the program target from the operation receiving unit 101. Next, the screen display unit 102 displays the programming screen 300 on the display device. The programming screen 300 is displayed in a state where a program for causing the controlled character 202 selected as the program target to perform the action is to be created.

In step S3, the operation receiving unit 101 receives an operation of creating the program. The operation of creating the program is performed by the player on the programming screen 300. Next, the operation receiving unit 101 sends information indicating the received operation to the programming unit 103.

The programming unit 103 creates the program in accordance with the content of the operation received from the operation receiving unit 101. The programming unit 103 creates the program by the program components being arranged and connected. The programming unit 103 controls the screen display unit 102 to display the created program on the programming screen 300.

In step S4, the operation receiving unit 101 receives an operation of executing the program. The operation of executing the program is performed by the player on the programming screen 300. Next, the operation receiving unit 101 sends information indicating the received operation to the programming unit 103. The programming unit 103 sends the program created in step S3 to the error detecting unit 104 in response to the operation by the player.

In step S5, the error detecting unit 104 receives the program from the programming unit 103. Next, the error detecting unit 104 detects the error from the received program. The detecting of the error includes determining whether the action instructed to the character fails for each of the program components included in the program.

If the error is detected from the program (YES), the error detecting unit 104 advances the process to step S6. If no error is detected from the program (NO), the error detecting unit 104 advances the process to step S9.

In step S6, the error detecting unit 104 sends information related to the error detected in step S5 to the error notifying unit 105. The error notifying unit 105 receives the information related to the error from the error detecting unit 104. Next, the error notifying unit 105 acquires information related to the program component indicating the action that the character fails to perform from the received information related to the error. Then, the error notifying unit 105 controls the screen display unit 102 to display the first error notification on the programming screen 300. For example, the error notifying unit 105 displays the error icon near the program component indicating the action that the character fails to perform.

In step S7, the error notifying unit 105 determines whether a predetermined operation has been performed on the error icon displayed on the programming screen 300 in the first error notification. If the predetermined operation has been performed (YES), the error notifying unit 105 advances the process to step S8. If the predetermined operation is not performed (NO), the error notifying unit 105 returns the process to step S3. Here, the case where the predetermined operation is not performed indicates a case where an operation other than the predetermined operation (for example, an operation of editing the program) is performed on the programming screen 300.

In step S8, the error notifying unit 105 identifies the program component on which the predetermined operation has been performed in step S7. Next, the error notifying unit 105 reads the error message indicating the content of the error detected in step S5 from the message storage unit 106. Subsequently, the error notifying unit 105 controls the screen display unit 102 to display the second error notification for the identified program component on the programming screen 300. For example, the error notifying unit 105 displays the error message indicating the reason why the action instructed by the program component fails, near the program component on which the predetermined operation is performed.

In step S9, the error detecting unit 104 notifies the programming unit 103 that no error has been detected. In response to the notification that no error has been detected, the programming unit 103 sends the program created in step S3 to the code converting unit 107.

The code converting unit 107 receives the program from the programming unit 103. Next, the code converting unit 107 generates the code for controlling the action of the controlled character 202, which is the programming target, based on the received program. Then, the code converting unit 107 sends the generated code to the action control unit 108.

In step S10, the action control unit 108 receives the code from the code converting unit 107. Next, the action control unit 108 controls the action of the controlled character 202 in the virtual space in accordance with the received code. Then, the action control unit 108 controls the screen display unit 102 to display the state in which the controlled character 202 is acting on the field screen 200. In the field screen 200, the controlled character 202, which is set as the programming target, performs a series of actions indicated in the program.

OTHER EMBODIMENTS

In the above embodiment, an example of checking whether the error is detected in the entire program, performing the error notification for the program component in which the error has been detected, and causing the controlled character to perform the action based on the program in which no error has been detected when the player performs the operation to start the program has been described. In this example, it can be said that the error detecting unit 104 plays a role to check the program in advance before causing the controlled character to perform the action according to the program, and the code converting unit 107 plays a role of a compiler to generate the code from the program in which no error is detected. Alternatively, in the present embodiment, after the player performs the operation to start the program, the error may be sequentially detected while the program is executed, without checking the program in advance before the action of the controlled character.

Specifically, when the player presses the play button 340 on the programming screen 300, the programming unit 103 sends the program corresponding to the program component arranged at the top of the arrangement area 330 to the code converting unit 107. The code converting unit 107 converts the program component into a code and the action control unit 108 controls the action of the controlled character 202 according to the code. As described, the code converting unit 107 sequentially interprets the program components, and therefore it can be said that the code converting unit 107 plays a role of an interpreter, and the action control unit 108 attempts to cause the controlled character 202 to perform the action instructed by the program component. Here, the error detecting unit 104 detects the error that occurs in the program component by determining whether the action of the controlled character 202 succeeds or fails.

As an example, when the error detecting unit 104 detects the error, the error notifying unit 105 performs the error notification. Subsequently, the programming unit 103 stops the execution of the program. In this example, when the error detecting unit 104 detects no error, the programming unit 103 sends the program corresponding to the second arranged program component in the arrangement area 330 to the code converting unit 107. Subsequently, the code converting unit 107, the action control unit 108, and the error detecting unit 104 repeatedly performs the action instructed by the program component and the error detection of the program component indicating the action being performed according to the arrangement of the program components in the arrangement area 330 until the execution of the program is stopped partway or the program is executed to the end.

Additionally, as another example, when the error detecting unit 104 detects the error, the error notifying unit 105 performs the error notification. Subsequently, the programming unit 103 continues to execute the program. That is, the programming unit 103 sends the program corresponding to the second arranged program component in the arrangement area 330 to the code converting unit 107. Then, the code converting unit 107, the action control unit 108, and the error detecting unit 104 repeatedly perform the action instructed by the program component and the error detection of the program component indicating the action being performed according to the arrangement of the program components in the arrangement area 330 until the program is executed to the end. Here, the reason why the execution of the program may be continued is that, as described above, even if an error occurs, the content of the action instructed by the program component in which the error has occurred is not achieved, and the error does not cause the program itself to fail.

In this example, the error notifying unit 105 may display the error notification near the controlled character operating according to the program on the field screen. For example, the error notifying unit 105 may display the error notification above the head of the controlled character 202 on the field screen 200 illustrated in FIG. 2, and may display the error notification with moving the position thereof, in conjunction with the position of the controlled character 202 moving around. Additionally, the error notification may be the first error notification or the second error notification.

Summary

As is clear from the above description, the information processing device 100 according to the embodiment of the present disclosure displays the programming screen 300 on which the program component indicating the action instructed to the controlled character 202 is arranged, detects the program component indicating the action that the character fails to perform, and highlights the detected program component.

The information processing device 100 may detect the program component when the program created on the programming screen 300 that includes the program component indicating an action to be failed does not fail but the content of the action indicated by the program component is not achieved. The fact that the program does not fail may indicate that the information processing device 100 can instruct, after detecting the program component indicating the action that the character fails to perform, the controlled character 202 to perform an action indicated by a program component following the program component.

The information processing device 100 may determine, based on the content of the action indicated by the program component and the state of the virtual space in which the controlled character 202 performs the action, whether the content of the action is to be achieved or has been achieved in the state, and detect the program component determined that the content is not to be achieved or has not been achieved as the program component indicating the action that the character fails to perform.

The information processing device 100 may display the error icon indicating the program component indicating the action that the character fails to perform. The information processing device 100 may display the error icon near the program component indicating the action that the character fails to perform.

When the operation is performed on the program component indicating the action that the character fails to perform, the information processing device 100 may display the information indicating the reason why the character fails to perform the action on the programming screen 300. The information indicating the reason for the failure of the action may be text describing the reason for the failure of the action. The text describing the reason for the failure of the action may include a word related to the content of the action.

When the information processing device 100 detects no program component indicating the action that the character fails to perform, the information processing device 100 may cause the controlled character 202 to perform a series of actions in accordance with the arrangement of the program components.

The information processing device 100 may display the programming screen 300 for causing the controlled character 202 designated by the user to perform the series of actions.

When an operation for causing the controlled character 202 to start the series of actions is performed, the information processing device 100 may detect a program component indicating the action that the character fails to perform. The information processing device 100 may detect the program component indicating the action that the character fails to perform when the program component is arranged on the programming screen 300.

The information processing device 100 may detect a program component that does not satisfy the condition for completing the action. The information processing device 100 may detect a program component in which an object on which the action is performed is not set. The information processing device 100 may detect a program component in which an object on which the action is performed is not present in the range in which the character can act.

The information processing device 100 may display the programming screen 300 for creating the program for causing the controlled character 202 to perform a series of actions by arranging multiple program components having predetermined functions and connecting the program components.

With this, according to the embodiment of the present disclosure, an information processing device that can notify a program component indicating an action that a character fails to perform can be provided.

In a program with a high degree of freedom for controlling the action of the character, a condition for completing each action becomes complicated, and it is difficult to create a program that covers all of these. According to the embodiment of the present disclosure, a program component indicating the action that the character fails to perform is highlighted, and thus the program component indicating the action that the character fails to perform can be easily identified.

Here, when an error that occurs in the program is provided by notification, the content of the error (for example, a syntax error or a mismatch error in a variable type) may be considered in the context of the language specification of the programming language. In programming for the purpose of learning programming, it is preferable to explain the content of the error so that even a person who is not familiar with programming can understand the error. According to the embodiment of the present disclosure, the reason why the character fails to perform the action is indicated according to the context of the action of the controlled character, and thus even a person who is not familiar with programming can easily understand the reason why the character fails to perform the action.

[Hardware Configuration of Information Processing Device]

A part or all of the devices (the information processing device 100) in the above-described embodiments may be configured by hardware, or may be configured by information processing of software (a program) executed by a central processing unit (CPU), a graphics processing unit (GPU), or the like. In the case where the embodiment is configured by the information processing of software, software implementing at least a part of the functions of each device in the above-described embodiments may be stored in a non-temporary storage medium (a non-temporary computer-readable medium) such as a compact disc-read only memory (CD-ROM) or a universal serial bus (USB) memory, and may be read into a computer to perform the information processing of software. The software may be downloaded via a communication network. Further, all or a part of the processing of software may be implemented in a circuit such as an application specific integrated circuit (ASIC) or a field programmable gate array (FPGA), so that information processing by the software may be performed by hardware.

The storage medium storing the software may be a detachable storage medium such as an optical disc or a fixed medium such as a hard disk or a memory. Additionally, the storage medium may be provided inside the computer (a main storage device, an auxiliary storage device, or the like) or may be provided outside the computer.

Figure 12:
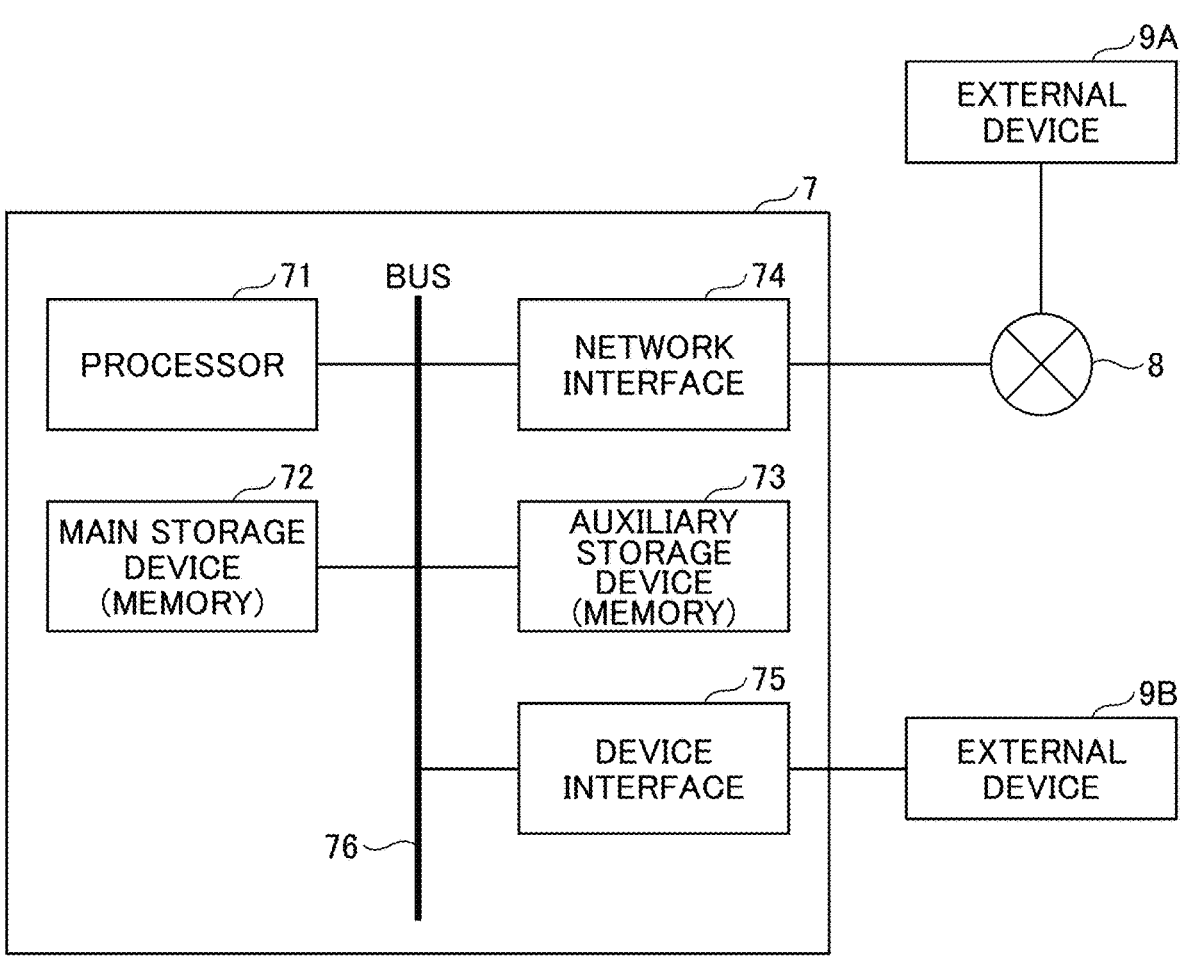
FIG. 12 is a block diagram illustrating an example of a hardware configuration of the information processing device.

FIG. 12 is a block diagram illustrating an example of a hardware configuration of each device (the information processing device 100) according to the above-described embodiments. Each device may be implemented as a computer 7 including a processor 71, a main storage device 72 (a memory), an auxiliary storage device 73 (memory), a network interface 74, and a device interface 75, which are connected to each other via a bus 76, for example.

The computer 7 of FIG. 12 includes one of each component, but may include two or more of the same components. Additionally, although one computer 7 is illustrated in FIG. 12, software may be installed in multiple computers, and each of the multiple computers may execute the same part or different parts of the processing of the software. In this case, a form of distributed computing in which the computers communicate with each other via the network interface 74 or the like to perform the processing may be employed. That is, each device (the information processing device 100) in the above-described embodiments may be configured as a system to implement functions by one or more computers executing instructions stored in one or more storage devices. Additionally, the information transmitted from a terminal may be processed by one or more computers provided on a cloud, and the processing result may be transmitted to the terminal.

Various operations of each device (the information processing device 100) in the above-described embodiments may be executed in parallel processing using one or more processors or using multiple computers via a network. Additionally, various operations may be distributed to multiple arithmetic cores in the processor to be executed in parallel processing. Additionally, some or all of the processes, means, and the like of the present disclosure may be realized by at least one of a processor or a storage device provided on a cloud that can communicate with the computer 7 via a network. As described, each device in the above-described embodiments may be in a form of parallel computing by one or more computers.

The processor 71 may be an electronic circuit (a processing circuit, processing circuitry, a CPU, a GPU, an FPGA, an ASIC, or the like) that performs at least one of computer control or operations. Additionally, the processor 71 may be any of a general-purpose processor, a dedicated processing circuit designed to execute a specific operation, and a semiconductor device including both a general-purpose processor and a dedicated processing circuit. Additionally, the processor 71 may include an optical circuit or may include an arithmetic function based on quantum computing.

The processor 71 may perform arithmetic processing based on data or software input from each device or the like of the internal configuration of the computer 7, and may output an arithmetic result or a control signal to each device or the like. The processor 71 may control respective components constituting the computer 7 by executing an operating system (OS), an application, or the like of the computer 7.

Each device (the information processing device 100) in the above-described embodiments may be implemented by one or more processors 71. Here, the processor 71 may refer to one or more electronic circuits arranged on one chip, or may refer to one or more electronic circuits arranged on two or more chips or two or more devices. When multiple electronic circuits are used, the electronic circuits may communicate with each other by wire or wirelessly.

The main storage device 72 may store instructions executed by the processor 71, various data, and the like, and information stored in the main storage device 72 may be read by the processor 71. The auxiliary storage device 73 is a storage device other than the main storage device 72. Here, these storage devices indicate any electronic components capable of storing electronic information, and may be semiconductor memories. The semiconductor memory may be either a volatile memory or a nonvolatile memory. A storage device for storing various data and the like in each device (the information processing device 100) in the above-described embodiments may be realized by the main storage device 72 or the auxiliary storage device 73, or may be realized by a built-in memory built in the processor 71. For example, each storage unit in the above-described embodiments may be implemented by the main storage device 72 or the auxiliary storage device 73.

When each device (the information processing device 100) in the above-described embodiments includes at least one storage device (memory) and at least one processor connected (coupled) to the at least one storage device, the at least one processor may be connected to one storage device. Additionally, at least one storage device may be connected to one processor. Additionally, a configuration in which at least one processor among the multiple processors is connected to at least one storage device among the multiple storage devices may be included. Additionally, this configuration may be realized by storage devices and the processors included in multiple computers. Furthermore, a configuration in which the storage device is integrated with the processor (for example, an L1 cache or a cache memory including an L2 cache) may be included.

The network interface 74 is an interface for connecting to the communication network 8 by wire or wirelessly. As the network interface 74, an appropriate interface, such as one conforming to an existing communication standard, may be used. The network interface 74 may exchange information with an external device 9A connected via the communication network 8. Here, the communication network 8 may be any one of a wide area network (WAN), a local area network (LAN), a personal area network (PAN), and the like, or a combination thereof, as long as information is exchanged between the computer 7 and the external device 9A.

Examples of the WAN include the Internet and the like, and examples of the LAN include IEEE802.11, Ethernet (registered trademark), and the like. Examples of the PAN include Bluetooth (registered trademark), Near Field Communication (NFC), and the like.

The device interface 75 is an interface, such as a USB, that is directly connected to an external device 9B.

The external device 9A is a device connected to the computer 7 via a network. The external device 9B is a device directly connected to the computer 7.

The external device 9A or the external device 9B may be, for example, an input device. The input device is, for example, a device, such as a camera, a microphone, a motion capture device, various sensors, a keyboard, a mouse, a touch panel, or the like, and gives acquired information to the computer 7. Alternatively, the device may be a device including an input unit, a memory, and a processor, such as a personal computer, a tablet terminal, or a smartphone.

Additionally, the external device 9A or the external device 9B may be, for example, an output device. The output device may be, for example, a display device, such as a liquid crystal display (LCD) or an organic electro luminescence (EL) panel, or may be a speaker that outputs sound or the like. Alternatively, the device may be a device including an output unit, a memory, and a processor, such as a personal computer, a tablet terminal, or a smartphone.

Additionally, the external device 9A or the external device 9B may be a storage device (a memory). For example, the external device 9A may be a network storage or the like, and the external device 9B may be a storage, such as an HDD.

Additionally, the external device 9A or the external device 9B may be a device having some functions of the components of each device (the information processing device 100) in the above-described embodiments. That is, the computer 7 may transmit a part or all of the processing result to the external device 9A or the external device 9B, or may receive a part or all of the processing result from the external device 9A or the external device 9B.

In the present specification (including the claims), if the expression "at least one of a, b, and c" or "at least one of a, b, or c" is used (including similar expressions), any one of a, b, c, a-b, a-c, b-c, or a-b-c is included. Multiple instances may also be included in any of the elements, such as a-a, a-b-b, and a-a-b-b-c-c. Further, the addition of another element other than the listed elements (i.e., a, b, and c), such as adding d as a-b-c-d, is included.

In the present specification (including the claims), if the expression such as "in response to data being input", "using data", "based on data", "according to data", or "in accordance with data" (including similar expressions) is used, unless otherwise noted, a case in which the data itself is used and a case in which data obtained by processing the data (e.g., data obtained by adding noise, normalized data, a feature amount extracted from the data, and intermediate representation of the data) is used are included. If it is described that any result can be obtained "in response to data being input", "using data", "based on data", "according to data", or "in accordance with data" (including similar expressions), unless otherwise noted, a case in which the result is obtained based on only the data is included, and a case in which the result is obtained affected by another data other than the data, factors, conditions, and/or states may be included. If it is described that "data is output" (including similar expressions), unless otherwise noted, a case in which the data itself is used as an output is included, and a case in which data obtained by processing the data in some way (e.g., data obtained by adding noise, normalized data, a feature amount extracted from the data, and intermediate representation of the data) is used as an output is included.

In the present specification (including the claims), if the terms "connected" and "coupled" are used, the terms are intended as non-limiting terms that include any of direct, indirect, electrically, communicatively, operatively, and physically connected/coupled. Such terms should be interpreted according to a context in which the terms are used, but a connected/coupled form that is not intentionally or naturally excluded should be interpreted as being included in the terms without being limited.

In the present specification (including the claims), if the expression "A configured to B" is used, a case in which a physical structure of the element A has a configuration that can perform the operation B, and a permanent or temporary setting/configuration of the element A is configured/set to actually perform the operation B may be included. For example, if the element A is a general purpose processor, the processor may have a hardware configuration that can perform the operation B and be configured to actually perform the operation B by setting a permanent or temporary program (i.e., an instruction). If the element A is a dedicated processor, a dedicated arithmetic circuit, or the like, a circuit structure of the processor may be implemented so as to actually perform the operation B irrespective of whether the control instruction and the data are actually attached.

In the present specification (including the claims), if a term indicating inclusion or possession (e.g., "comprising", "including", or "having") is used, the term is intended as an open-ended term, including inclusion or possession of an object other than a target object indicated by the object of the term. If the object of the term indicating inclusion or possession is an expression that does not specify a quantity or that suggests a singular number (i.e., an expression using "a" or "an" as an article), the expression should be interpreted as being not limited to a specified number.

In the present specification (including the claims), even if an expression such as "one or more" or "at least one" is used in a certain description, and an expression that does not specify a quantity or that suggests a singular number (i.e., an expression using "a" or "an" as an article) is used in another description, it is not intended that the latter expression indicates "one". Generally, an expression that does not specify a quantity or that suggests a singular number (i.e., an expression using "a" or "an" as an article) should be interpreted as being not necessarily limited to a particular number.

In the present specification, if it is described that a particular advantage/result is obtained in a particular configuration included in an embodiment, unless there is a particular reason, it should be understood that that the advantage/result may be obtained in another embodiment or other embodiments including the configuration. It should be understood, however, that the presence or absence of the advantage/result generally depends on various factors, conditions, and/or states, and that the advantage/result is not necessarily obtained by the configuration. The advantage/result is merely an advantage/result that is obtained by the configuration described in the embodiment when various factors, conditions, and/or states are satisfied, and is not necessarily obtained in the invention according to the claim that defines the configuration or a similar configuration.

In the present specification (including the claims), if multiple hardware performs predetermined processes, each of the hardware may cooperate to perform the predetermined processes, or some of the hardware may perform all of the predetermined processes. Additionally, some of the hardware may perform some of the predetermined processes while other hardware may perform the remainder of the predetermined processes. In the present specification (including the claims), if an expression such as "one or more hardware perform a first process and the one or more hardware perform a second process" is used, the hardware that performs the first process may be the same as or different from the hardware that performs the second process. That is, the hardware that performs the first process and the hardware that performs the second process may be included in the one or more hardware. The hardware may include an electronic circuit, a device including an electronic circuit, or the like.

In the present specification (including the claims), if multiple storage devices (memories) store data, each of the multiple storage devices (memories) may store only a portion of the data or may store an entirety of the data. Additionally, a configuration in which some of the multiple storage devices store data may be included.

In the present specification (including the claims), the terms "first," "second," and the like are used as a method of merely distinguishing between two or more elements and are not necessarily intended to impose technical significance on their objects, in a temporal manner, in a spatial manner, in order, in quantity, or the like. Therefore, for example, a reference to first and second elements does not necessarily indicate that only two elements can be employed there, that the first element must precede the second element, that the first element must be present in order for the second element to be present, or the like.

Although the embodiments of the present disclosure have been described in detail above, the present disclosure is not limited to the individual embodiments described above. Various additions, modifications, substitutions, partial deletions, and the like can be made without departing from the conceptual idea and spirit of the invention derived from the contents defined in the claims and the equivalents thereof. For example, in the embodiments described above, if numerical values or mathematical expressions are used for description, they are presented as an example and do not limit the scope of the present disclosure. Additionally, the order of respective operations in the embodiments is presented as an example and does not limit the scope of the present disclosure.

What is claimed is:

1. An information processing device comprising:
at least one memory; and
at least one processor;
wherein the at least one processor is configured to:
display, on a display device, a screen for creating a program that causes a character designated by a user to perform a series of actions by visual programming, a plurality of program components being arranged on the screen, the plurality of program components indicating a plurality of actions included in the series of actions, and the screen being a screen for creating the program that causes the character to perform the series of actions by arranging the plurality of program components having predetermined functions and by connecting the plurality of program components; and
perform, based on a detection of a failure of an action performed by the character, a notification related to a program component indicating the action that the character fails to perform, the detection of the failure of the action performed by the character being performed by a detecting unit that is different from the display device on which the screen is displayed, and the notification including highlighting the program component indicating the action that the character fails to perform.

2. The information processing device as claimed in claim 1, wherein the highlighting includes displaying a mark indicating the program component indicating the action that the character fails to perform.

3. The information processing device as claimed in claim 1, wherein the highlighting includes displaying a mark near the program component indicating the action that the character fails to perform.

4. The information processing device as claimed in claim 1, wherein the highlighting includes displaying, on the screen, information indicating a reason why the character fails to perform the action, when an operation is performed on the program component indicating the action that the character fails to perform.

5. The information processing device as claimed in claim 1, wherein the at least one processor is configured to:
try to make the character to perform the action indicated by the program component, and determine whether the character has failed to perform the action; and
highlight the program component in response to determining that the character has failed to perform the action.

6. The information processing device as claimed in claim 1, wherein the at least one processor is configured to detect the program component indicating the action that the character fails to perform among the plurality of program components arranged on the screen.

7. The information processing device as claimed in claim 1, wherein the at least one processor is configured to instruct the character to perform an action indicated by a program component subsequent to the program component indicating the action that the character fails to perform, when the failure of the action is detected.

8. The information processing device as claimed in claim 1, wherein the at least one processor is configured to:
determine, based on a content of the action indicated by the program component and a state of a virtual space where the character performs the action, whether the content of the action is to be achieved or has been achieved in the state; and
detect the program component determined that the content of the action is not to be achieved or has not been achieved as the program component indicating the action that the character fails to perform.

9. The information processing device as claimed in claim 1, wherein the at least one processor is configured to display the screen for causing the character to perform the action, the character being designated by a user among a plurality of characters existing in a virtual space.

10. The information processing device as claimed in claim 1, wherein the at least one processor is configured to detect the program component that does not satisfy a condition for completing the action as the program component indicating the action that the character fails to perform.

11. The information processing device as claimed in claim 1, wherein the notification is a notification of a reason of the failure of the action indicated by the program component indicating the action that the character fails to perform.

12. The information processing device as claimed in claim 1, wherein the notification is a notification including a word related to a content of the action indicated by the program component indicating the action that the character fails to perform.

13. The information processing device as claimed in claim 1, wherein the at least one processor is configured to:

control actions of a plurality of said characters based on programs created by the visual programming, and display the notification in association with the character that acts according to the program including the program component indicating the action that the character fails to perform, among the plurality of characters.

14. The information processing device as claimed in claim 1, wherein the at least one processor is configured to:

control actions of a plurality of said characters based on programs created by the visual programming, and display the notification near the character that acts according to the program including the program component indicating the action that the character fails to perform, among the plurality of characters.

15. The information processing device as claimed in claim 1, wherein the at least one processor is configured to:

control actions of a plurality of said characters based on programs created by the visual programming, and display the notification at a position in conjunction with a position of the character that acts according to the program including the program component indicating the action that the character fails to perform, among the plurality of characters.

16. A method for execution by one or more computers, the method comprising:

displaying, on a display device, a screen for creating a program that causes a character designated by a user to perform a series of actions by visual programming, a plurality of program components being arranged on the screen, the plurality of program components indicating a plurality of actions included in the series of actions, and the screen being a screen for creating the program that causes the character to perform the series of actions by arranging the plurality of program components having predetermined functions and by connecting the plurality of program components; and performing, based on a detection of a failure of an action performed by the character, a notification related to a program component indicating the action that the character fails to perform, the detection of the failure of the action performed by the character being performed by a detecting unit that is different from the display device on which the screen is displayed, and the notification including highlighting the program component indicating the action that the character fails to perform.

17. A non-transitory computer-readable recording medium having stored therein a computer program for causing one or more computers to perform a process comprising:

displaying, on a display device, a screen for creating a program that causes a character designated by a user to perform a series of actions by visual programming, a plurality of program components being arranged on the screen, the plurality of program components indicating a plurality of actions included in the series of actions, and the screen being a screen for creating the program that causes the character to perform the series of actions by arranging the plurality of program components having predetermined functions and by connecting the plurality of program components; and performing, based on a detection of a failure of an action performed by the character, a notification related to a program component indicating the action that the character fails to perform, the detection of the failure of the action performed by the character being performed by a detecting unit that is different from the display device on which the screen is displayed, and the notification including highlighting the program component indicating the action that the character fails to perform.

* * * * *